United States Patent [19]

Goes et al.

[11] 4,335,644

[45] Jun. 22, 1982

[54] FLUIDIC RECOIL BUFFER FOR SMALL ARMS

[76] Inventors: Michael J. Goes, 221 Randolph Ave., Mine Hill, Morris County, N.J. 07801; Albertus E. Schmidlin, 28 High View Rd., Caldwell, Essex County, N.J. 07006

[21] Appl. No.: 261,090

[22] Filed: May 7, 1981

Related U.S. Application Data

[62] Division of Ser. No. 75,470, Sep. 14, 1979, Pat. No. 4,307,653.

[51] Int. Cl.³ .............................................. F41D 11/12
[52] U.S. Cl. ...................................... 89/198; 188/282; 188/317
[58] Field of Search ...................... 42/74; 89/43, 198; 137/812; 188/281, 282, 317, 319, 320, 322.15, 322.22

[56] References Cited

U.S. PATENT DOCUMENTS 3,672,474  6/1972  Mayer et al. .......................... 188/282
3,993,294  11/1976  Wössner et al. ...................... 188/314

FOREIGN PATENT DOCUMENTS 697799  10/1940  Fed. Rep. of Germany ...... 188/320
518919  9/1960  France ................................ 89/43 R

*Primary Examiner*—Stephen C. Bentley
*Attorney, Agent, or Firm*—Nathan Edelberg; Robert P. Gobson; Max Yarmovsky

[57] ABSTRACT

An improved buffer for small arm weapons utilizes a pair of fluid containing reciprocating chambers to attenuate recoil forces by limiting fluid flow in relation to chamber travel between the pair. In the second chamber of the pair a flow control element moves in the direction of a restricting member when the fluid pressure drop through the flow control element reaches a predetermined point. The flow restricting member limits fluid flow through the flow control element when the flow control element travels to a point proximate the flow restricting member. Fluid flow in the opposite direction is substantially unrestricted by the flow restricting members.

6 Claims, 8 Drawing Figures

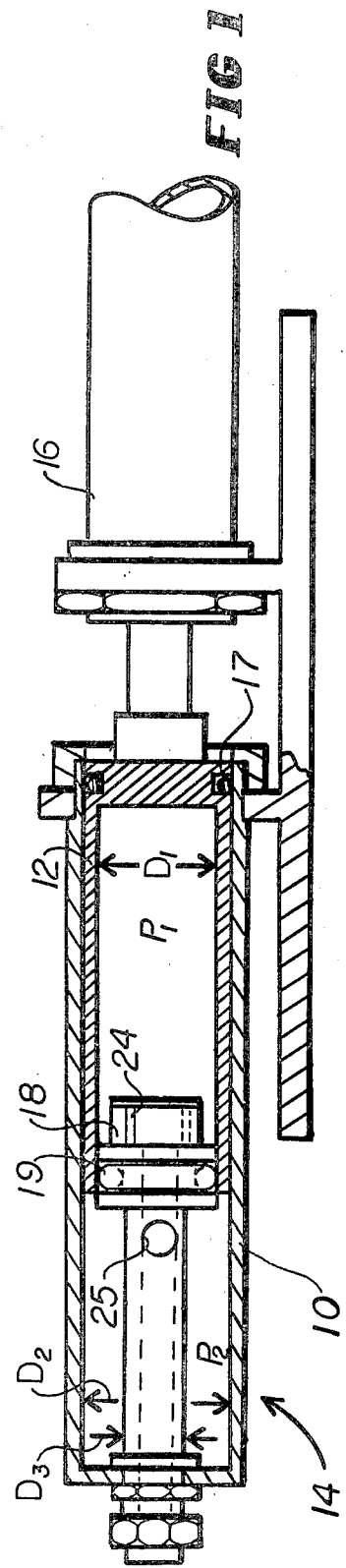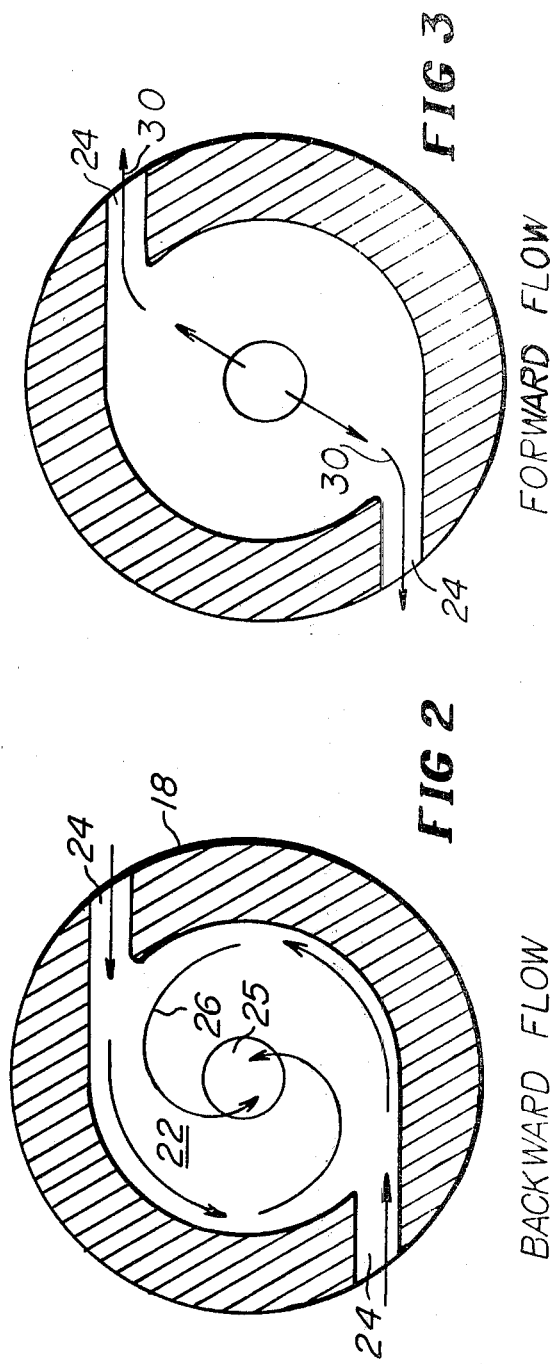

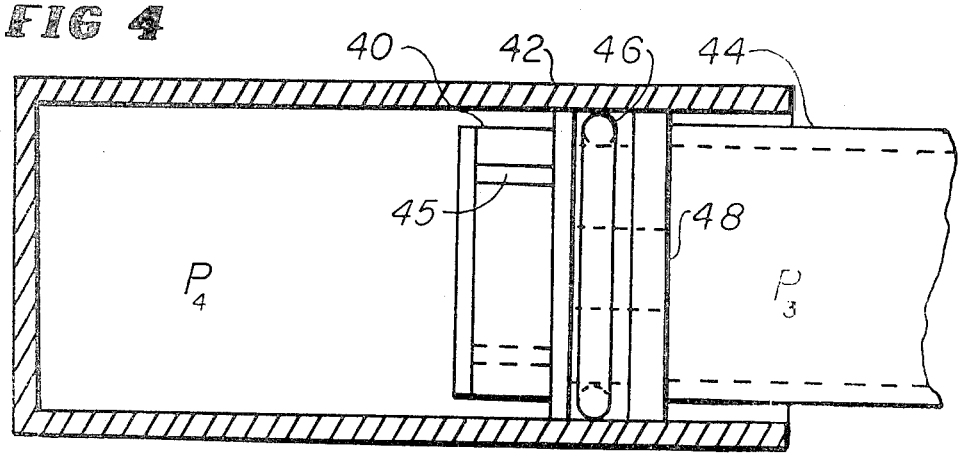
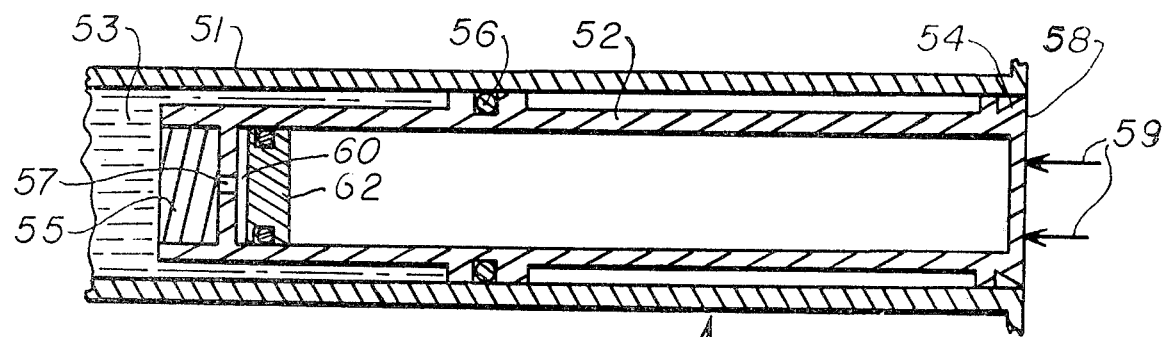
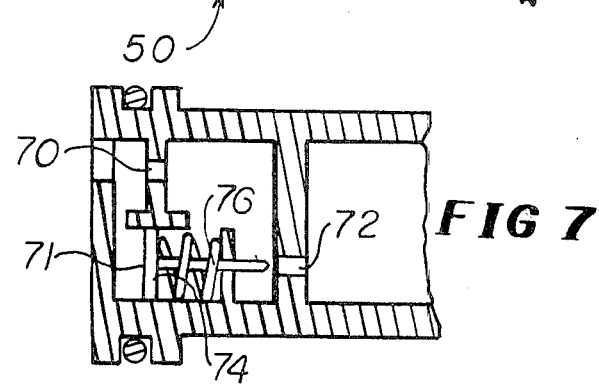
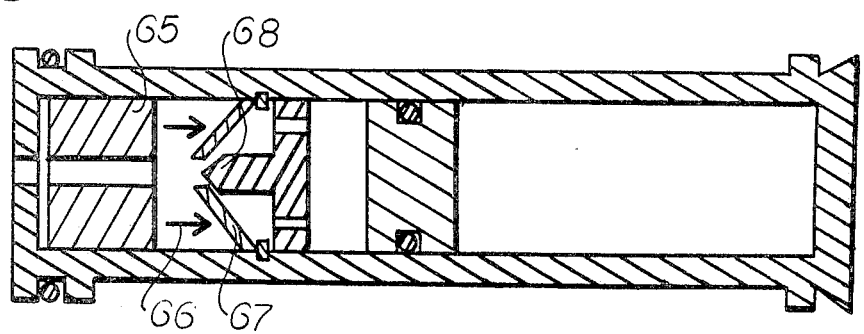

TYPICAL TEST DATA: M16A1

FLUIDIC RECOIL BUFFER FOR SMALL ARMS

GOVERNMENTAL INTEREST

The invention described herein may be manufactured, used and licensed by or for the Government for Governmental purposes without the payment to me of any royalties thereon.

This application is a division of application Ser. No. 075,470, filed Sept. 14, 1979, now U.S. Pat. No. 4,307,653.

BACKGROUND OF THE INVENTION

1. Field of the Invention

This invention relates to a recoil attenuating mechanism for weapons, and more particularly, to a fluidic recoil buffer for small caliber weapons.

2. Description of the Prior Art

There has been a long standing problem of attenuating small arms recoil or "kick." Essentially, the problem is one of controlling the equal but opposite reaction to every action.

The firing of a small caliber weapon results in the generation of high rearward forces which have adverse effects on both the weapon components and the user. These forces have a direct bearing on the design of components, the materials available for components and the construction of complete weapons to withstand the applied loads. In addition, the kick causes the muzzle of the weapon to move upward and the entire weapon has a tendency to move rearward. This is undesirable from a user's standpoint.

Previously, various devices or combination of devices have been employed to attenuate recoil. By way of example, recoil pads are used on butt stocks to cushion the rearward motion of the weapon, muzzle brakes are employed to reduce muzzle movement and hydraulic/hydropneumatic shock absorber are employed at the end of the recoil cycle. Mechanical buffers which depend upon inertia effects and the compression of cushioning materials to attenuate recoil are employed, and the drive springs which are used in counter recoil somewhat damp the movement. Another method employed is to allow the weapon to recoil while the barrel, bolt, etc., is moved forward. This method of firing out of battery uses the recoil to stop the counter recoil thus producing "soft" recoil operation. Timing delays in chamber opening also damp some of the recoil forces.

The previous methods employed to damp out recoil are in some cases marginal, and other cases quite effective. The more effective method often require many component part or mechanisms to accomplish the task, and are normally suited to one specific set of loading conditions. That is, they are not load sensitive. The only known load sensitive buffer to date is of the hydropneumatic shock absorber variety. This device, however, only functions at the end of the recoil cycle.

SUMMARY OF THE INVENTION

It has now been found that a load sensitive buffer which requires few component parts for operation, which operates through the complete recoil cycle and which is a passive device requiring no stored energy for operation, can be provided through the use of a fluidic diode.

In accordance with the present invention, a weapon is provided with means to buffer the recoil which is produced when the weapon is fired. The buffer includes a fluidic device having a first and second chamber. During recoil, a compressive force is applied to the fluid in the first chamber and flow from the first chamber to the second chamber is restricted by a fluidic diode in relationship to the pressure differential between the first and second chamber. On counter recoil, the fluid flows from the second chamber to the first chamber in an essentially unrestricted manner. The level of flow restriction by the fluidic diode is greater at high pressure differentials than at low pressure differentials.

BRIEF DESCRIPTION OF THE DRAWINGS

The objects and advantages of the invention will become apparent from the specification, particularly when read in conjunction with the drawings wherein:

FIG. 1, is a schematic illustration of a recoil buffer, in accordance with the present invention;

FIG. 2, is a schematic illustration of a vortex chamber showing fluid flow during recoil;

FIG. 3, is a schematic illustration of the vortex chamber of FIG. 2, showing the flow during counter-recoil;

FIG. 4, is a fragmentary schematic illustration of another modification of a recoil buffer of the present invention;

FIG. 5, is a fragmentary schematic illustration of a further modification of a recoil buffer of the present invention;

FIG. 6, is a schematic illustration of a modification of a flow control mechanism for use with the device of FIG. 5;

FIG. 7, is a schematic illustration of a further modification of a flow control mechanism.

DESCRIPTION OF THE PREFERRED EMBODIMENTS

Figure 8:
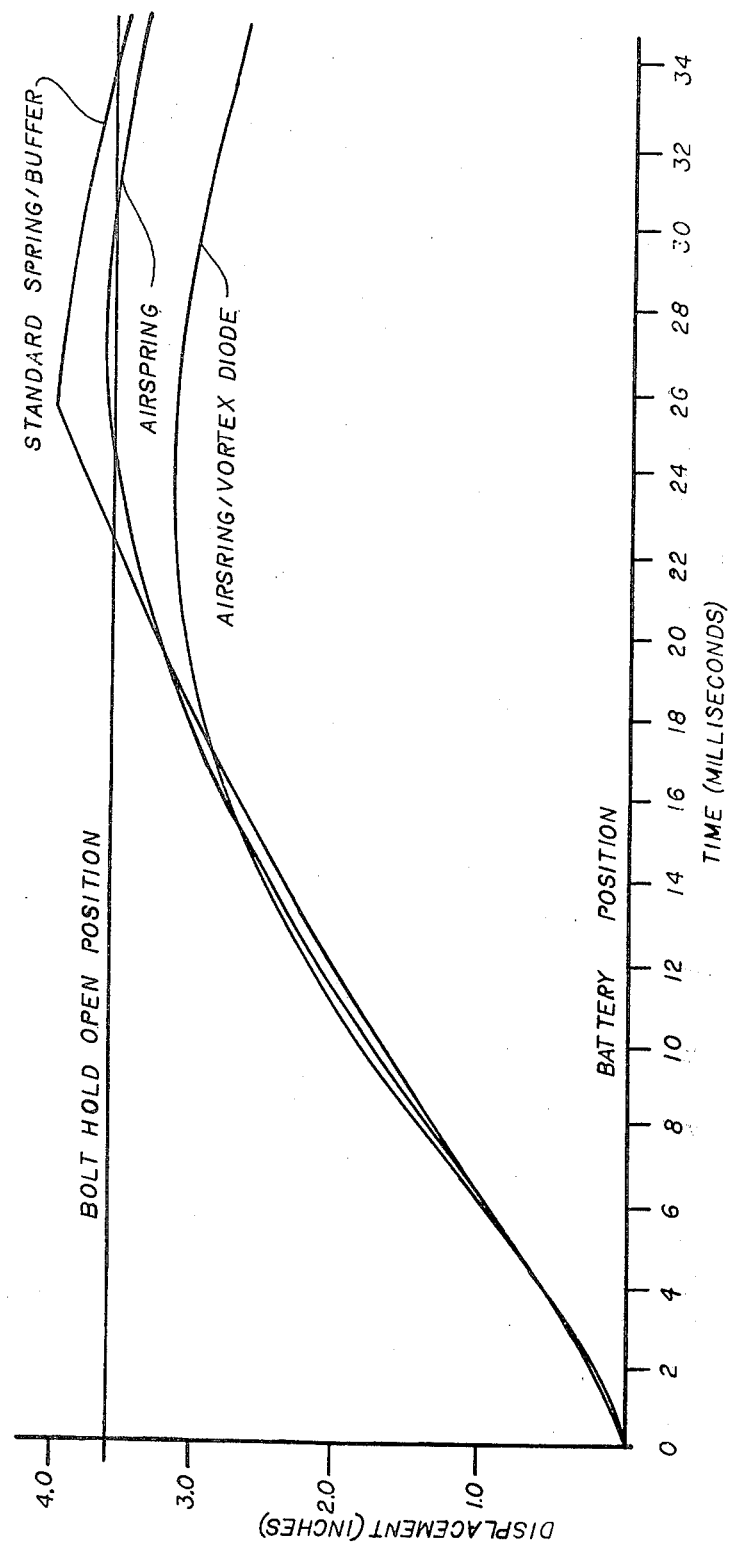
FIG. 8, is a graph comparing a time-displacement wave for an air spring, a mechanical spring/buffer and a vortex buffer.

The fluidic recoil buffer is load sensitive, requires few component parts for operation, operates through the complete recoil cycle, and is a passive device requiring no stored energy for operation. The present family of devices will function in recoil, counter recoil, or both directions. A single fluidic recoil buffer used in the recoil mode will not noticably interfere to any significant degree. Back to back, the fluidic recoil buffers will attenuate both recoil and counter recoil.

The fluidic recoil buffer provides an increase in weapon performance and reliability by desensitizing the weapon's response to varying ammunitions and environmental operating conditions.

Since the device functions through the recoil cycle and is load sensitive, it provides damping where it is needed most, that being the beginning of the recoil cycle. It is at this time that the greatest component loading is incurred. From an operating standpoint, this allows weapons to be overpowered, thus assuring their proper functioning under adverse operating environments. Recoiling components can be reduced in size and weight, drive springs can be designed for counter recoil only, and the possibility now exists for a high powered blowback operated weapon. The fluidic recoil buffer of the present invention allows the designer more effective control of the rate of fire and facilitates the employment of larger magazine capacities.

The life of weapon components will be extended because the recoil shock is attenuated by the fluidic recoil buffer of the present invention, rather than the components themselves, which reduces the weapon maintenance requirements. The user will have a more stable weapon which will operate in severe environments with fewer maintenance requirements.

The fluidic recoil buffer consists of a load sensitive metering device such as a Vortex Diode within a tube which is closed on at least one end. The Vortex Diode may either be fixed, with the tube free to move, or it may be designed to move within a fixed tube. The Vortex Diode is a fluidic device comprised of a vortex chamber, nozzles and a vent. The vortex chamber and nozzles are covered such that any flow of fluid must pass through the nozzle tangentially to the vortex chamber. The circular shape of the chamber provides an angular acceleration to the fluid stream, the magnitude of which is dependent on the nozzle exit velocity of the fluid and radius of curvature of the vortex chamber. The resultant angular velocity of the fluid causes the formation of a vortex within the vortex chamber which restricts the exit flow of fluid through the vent.

The fluidic diode is illustrated in FIG. 1, installed in a M16A1 rifle recoil spring tube, with an air spring serving as the counter recoil mechanism.

The term fluidic diode, as used herein, refers to a device which provides restricted fluid flow in one direction but substantially unrestricted fluid flow in the other direction. The fluidic diode preferably responds inversely proportionally to the pressure differential to which it is subjected. That is, the higher the pressure differential, the greater the degree of flow restriction that is applied to the fluid passing through the diode, and consequently, the lower the relative flow rate.

The rate of fluid flowing through the diode is a factor of the pressure differential and the degree of flow restriction. Therefore, it is possible to increase the flow rate even in the presence of increased flow resistance, if the flow resistance change is not directly proportional to the change in the pressure differential.

Accordingly, it is possible to custom design the buffering effect which can be achieved, by controlling both the rate of change of the degree of restriction relative to the rate of change of the pressure differential, and the degree of restriction at at maximum, minimum or other level of pressure differential.

The the embodiment of FIG. 1, the fluid in response to the pressure of the actuator 16, which must be compressible, flows from the buffer tube 12 to the recoil spring tube 10, until a pressure equalization is achieved. The buffer tube "O-ring" seal 17 precludes fluid flow out of the recoil spring tube through the recoil spring tube-buffer tube contact region. While the "O-ring" 19 precludes fluid flow from the buffer tube to the recoil spring tube, except through the vortex diode.

The high pressure differential created by the flow restricting characteristics of the vortex in the fluidic diode 18 attenuates the recoiling bolt carrier motion. The magnitude of attenuation is dependent upon not only the fixed parameters of fluid viscosity and diode configuration, but also on the variable parameter of recoil velocity. High recoil velocities result in high pressure differentials and in turn high flow restriction through the vortex diode. As the recoil is buffered, the velocity decreases, thereby decreasing the damping force and producing decreased pressure differentials which produces decreased flow restriction. Consequently, the buffering action is greatest when needed and least when least desirable and most importantly directly relative to need.

In counter recoil, the compressed fluid restores the system to its initial configuration. The counter motion can be alternatively or additionally achieved through the use of a return spring.

In order to provide an air spring, the spring tube 10 and the buffer tube 12 are dimensioned such that the area represented by $D_1$ is greater than that represented by $D_2-D_3$. The assembly 14 is pressurized to a predetermined positive pressure typically on the order of from 7 to 10 psig.

In a test procedure, the actuator 16 is subjected to sufficient air pressure to force the buffer tube 12 down the recoil spring tube 10. A pressure differential is created across the vortex diode 18, with the pressure $P_1$ being greater than the pressure $P_2$ is the spring tube 10. The fluid in the buffer tube is forced through the fluidic diode as shown in FIG. 2.

The fluidic diode is a device which includes a vortex chamber 22, nozzles 24 and a vent 25. Fluid flowing in the direction of flow arrows 26 must pass through the nozzles and is forced to spiral, creating a vortex and then exits through the vent 25. As evident from FIG. 2, the circular shape of the vortex chamber 22, provides an angular acceleration to the tangentially flowing fluid streams, the magnitude of which is dependent on the nozzle exit velocity of the fluid and radius of curvature of the vortex chamber. The resultant angular velocity of the fluid causes the formation of a vortex within the vortex chamber, thereby restricting the exit flow of fluid through the vent 25 into the recoil spring tube 10.

In the opposite flow direction, as illustrated by arrows 30, of FIG. 3, the fluid enters the vortex through the vent 25, passes through the vortex chamber directly toward the nozzles 24, with the vent orifice diameter and the orifice cross-section of the nozzles being the only restrictions to the fluid flow.

The vortex diode will function with any type of fluid. The attenuation is in part dependent upon the fluid viscosity. For a given set of diode parameters, the damping effect is directly relative to the viscosity.

In another embodiment as illustrated in FIG. 4, the fluidic buffer 40, floats or travels relative to the buffer tube 42. The recoiling weapon component 44, which can be a bolt carrier or similar element, forces the fluidic diode 40 toward the closed end of the buffer tube 42. The fluid, for example air, is compressed by the displacement of the moving fluidic diode 40, causing a pressure differential across the diode, with the pressure $P_4$ in the buffer tube being greater than the pressure $P_3$ in the bolt carrier device. The "O-ring" seal 46 around the fluidic diode, prevents the escape of fluid around the outside edge of the diode-tube interface. Thus, the fluid flows through the nozzles 45 creating a vortex as previously described, and exits through the vent 48 to the low pressure side. The high pressure differential created by the flow restricting characteristics of the vortex attenuates the recoiling bolt carrier motion.

In counter recoil, the fluidic diode 40 is driven toward the open end of the buffer tube by the weapon drive spring, or return springs which can be included within the buffer tube. Movement in this direction causes the pressure $P_3$ to be greater than the pressure $P_4$, resulting in fluid flow in the forward direction through the diode in an essentially unrestricted manner as previously described. Little damping effect is produced by the essentially unrestricted fluid flow.

FIG. 5 shows an air/oil buffer device 50, which can be fixed to a gun in a suitable manner, such as in the stock. An air spring cylinder 52 is provided with two primary seals 54 and 56. The seal 54 is a scraper ring which prevents foreign matter from entering the tube during the operation of the device while the "O-ring" seal 56 prevents oil from escaping around the cylinder.

In operation, the air spring cylinder is forced in the direction of the arrows 59, as a result of the force of a gun bolt (not shown) applied at the surface 58 of the air spring cylinder. The air spring cylinder is driven into the oil chamber 51, compressing the oil 53. The resulting pressure supplies the buffering force which impedes the motion of the bolt. The oil is caused to flow through a flow control device 55, the port 57 and into the variable chamber 60. The floating piston 62 serves to separate the incoming oil from the air which occupies the region within the air spring cylinder 52. As the motion continues, the floating piston 62 moves away from the flow control device 55, thereby compressing the air within the air spring cylinder 52 and providing the "air spring" action. The motion is controlled by modulating the oil flow through the flow control element 55.

The flow control element 55 can be of several designs, the simplest being a fluidic vortex diode as previously described. Alternatively, other designs can have moving parts and can be designed to respond to pressure, acceleration (inertia) and/or flow forces.

As in the manner previously noted, when the bolt has reached its rearward position, the flow control mechanism is at its extreme position and the air spring mechanism is in the compressed state. The pneumatic energy of the compressed air is now available to return the bolt to its forward position. Motion of the bolt in the return direction is also controlled by the reverse flow through the flow control element 55.

In the modification of FIG. 6, the flow control element 65 moves in the direction of the arrows 66 when the pressure drop through the flow control element 65 reaches a design point, and the flow restricting components 67 and 68 limit the flow through the flow control device when the flow control device has traveled to a point proximate the flow restricting components. Flow in the opposite direction is obviously unrestricted by the flow restricting components. For controlled flow in both directions, the elements can be designed as a double acting unit or two elements can be used in series with opposite direction of response.

In the modification of FIG. 7, the flow control mechanism includes a first flow passage 70 and a second flow passage 72. The flow passage 70 restricts flow thus causing a pressure differential to exist with the outer face 71 of the head of the piston 74 seeing a lighter pressure than the opposing surface of the piston 74, causing the piston to move toward the port 72, restricting flow through the port 72. When the pressure differential approaches or equals zero or a predetermined level, the spring 76 moves the piston in the opposite direction. Thus, on counter recoil, flow in the opposite direction is limited only by the diameters of the two ports.

Time displacement curves for three modifications incorporating a standard mechanical spring/buffer, a vortex diode/air spring buffer and a pure air spring (with no diode) are illustrated in FIG. 8.

The air spring showed improvement over the mechanical spring buffer while the vortex diode showed improvement over each of the other devices.

A comparison of the section of typical M16A1 rifle time-displacement (TD) curves illustrated in FIG. 8 shows the damping effects of the air spring and the air spring/vortex diode buffer. The TD curves, which show the motion of the weapon bolt carrier with respect to time, show the damping as the gradual transition from recoil to counter recoil as opposed to the peak exhibited by the standard spring/buffer combination. In addition damping effects of the vortex diode is illustrated by the reduced maximum displacement of the air spring/vortex diode TD curve.

What is claimed is:

1. A fluidic recoil buffer comprising:
   first fluid containing chamber;
   actuator means for applying a compressive force to fluid in said first chamber;
   a second fluid containing chamber slidably positioned in said first fluid containing chamber, said second chamber dimensioned and positioned for reciprocating motion within said first chamber, said second chamber including;
   seal means, slidably moveable with said second chamber, for providing a fluid seal between said first chamber and said second chamber; and
   a closed rear surface on a closed end of said second chamber and an axial throttle hole in the front end of said second chamber;
   fluidic means operatively disposed in said second fluid chamber for providing restricted fluid flow from said first chamber to said second chamber and substantially unrestricted fluid flow from said second chamber to said first chamber, said second chamber including;
   flow restricting means for restricting fluid flow from said first chamber to said second chamber;
   a flow control member, having an axial passageway therethrough, slidably disposed in said second chamber intermediate said front end of said second chamber and said flow restricting means, said flow control member moving toward said flow restricting means when the pressure drop through said flow control member reaches a predetermined design point, and said flow restricting means limiting the fluid flow through said fluid control member when said flow control member travels to a point proximate said flow restricting means; and
   a floating piston member slidably disposed intermediate said flow restricting means and said closed end of said second chamber.

2. The fluidic recoil buffer of claim 1 wherein the fluid in said first chamber is incompressible and the fluid disposed intermediate said floating piston member and said closed end of said second chamber is relatively compressible.

3. The fluidic recoil buffer of claim 1, wherein said flow restricting means includes;
   a flow restricting component fixedly disposed in said second chamber; and
   a flow restricting limit member fixedly disposed intermediate said flow restricting component and said floating piston member, said flow limit member cooperating with said flow restricting component to provide substantially unrestricted flow of said fluid from said second chamber to said first chamber.

4. The fluidic recoil buffer of claim 3, wherein said flow control member is moveable toward said flow restricting means when the pressure in said second chamber is greater than the pressure in said first chamber whereby said flow restricting means becomes positioned proximate said passage of said flow control member and restricts fluid flow through said passage.

5. The fluidic recoil buffer of claim 1, wherein the fluidic means restricts fluid flow in direct relation to the level of pressure differential, whereby restriction is highest initially and decreases at the end of a recoil cycle.

6. A weapon having a recoil buffer comprising:
 a first fluid containing chamber having an open end and a closed end;
 a second fluid containing chamber slidably positioned in the open end of said first chamber, said second chamber including;
  seal means slidably moveable with said second chamber for providing a fluid seal between said first chamber and said second chamber; and
  a closed rear surface on a closed end of said second chamber and an axial throttle hole in the other end of said second chamber;
 bolt means for applying a force to said closed end of said second chamber;
 fluidic means operatively disposed in said second fluid chamber for providing restrictive fluid flow from said first chamber to said second chamber and substantially unrestricted fluid flow from said second chamber to said first chamber, said second chamber including;
  flow restricting means for restricting fluid flow from said first chamber to said second chamber;
  a flow control member, having an axial passageway therethrough, slidably disposed in said second chamber intermediate said front end of said chamber and said flow restricting means, said flow control member moving toward said flow restricting means when the pressure drops through said flow control member reaches a predetermined design point, and said flow restricting means limiting the fluid flow through said fluid control member travels to a point proximate said flow restricting means; and
  a floating piston member slidably disposed intermediate said flow restricting means and said closed end of said second chamber.

* * * * *